(12) United States Patent
Guenther

(10) Patent No.: US 7,254,168 B2
(45) Date of Patent: Aug. 7, 2007

(54) METHOD FOR DECOMPOSING TIMING JITTER ON ARBITRARY SERIAL DATA SEQUENCES

(75) Inventor: Mark L. Guenther, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 797 days.

(21) Appl. No.: 10/625,951

(22) Filed: Jul. 23, 2003

(65) Prior Publication Data

US 2004/0136450 A1   Jul. 15, 2004

Related U.S. Application Data

(60) Provisional application No. 60/422,631, filed on Oct. 29, 2002.

(51) Int. Cl.
  *H04Q 1/20*    (2006.01)
  *H04L 7/00*    (2006.01)
  *G01R 13/00*   (2006.01)

(52) U.S. Cl. .................. 375/226; 375/371; 702/69
(58) Field of Classification Search .............. 375/226, 375/368, 371; 370/516; 702/66, 69, 70
  See application file for complete search history.

(56) References Cited

U.S. PATENT DOCUMENTS

| | | | |
|---|---|---|---|
| 6,137,283 A * | 10/2000 | Williams et al. .......... 324/76.12 |
| 6,753,677 B1* | 6/2004 | Weller et al. ............ 324/121 R |
| 6,832,172 B2* | 12/2004 | Ward et al. .................... 702/69 |
| 6,898,535 B2* | 5/2005 | Draving ........................ 702/69 |
| 6,993,695 B2* | 1/2006 | Rivoir ......................... 714/734 |
| 2003/0031284 A1* | 2/2003 | Ishida et al. ................. 375/371 |
| 2004/0062301 A1* | 4/2004 | Yamaguchi et al. ......... 375/226 |
| 2004/0146097 A1* | 7/2004 | Jungerman et al. ......... 375/226 |
| 2004/0260492 A1* | 12/2004 | Halle et al. ................... 702/69 |

* cited by examiner

*Primary Examiner*—Young T. Tse
(74) *Attorney, Agent, or Firm*—Moser, Patterson, Sheridan, LLP; Francis I. Gray

(57) ABSTRACT

A method and apparatus for decomposing timing jitter on arbitrary serial data sequences. Specifically, in one embodiment according to the present invention, a method is provided of decomposing timing jitter on a signal under test (SUT) comprising an arbitrary serial data stream. The method comprises performing a statistical analysis on a group of measurements, where each measurement comprises a timing jitter value and an associated bit pattern representing the bits falling within an analysis window, said window being successively located at a plurality of positions within the data stream.

20 Claims, 6 Drawing Sheets

| p₁ | p₂ | ... | pᵢ | t_α | t_β | s₁ | s₂ | ... | sⱼ |

*FIG. 5*

METHOD FOR DECOMPOSING TIMING JITTER ON ARBITRARY SERIAL DATA SEQUENCES

CLAIM OF PRIORITY

This application claims priority from U.S. Provisional Patent Application No. 60/422,631, filed Oct. 29, 2002 and entitled "Method for Decomposing Timing Jitter on Arbitrary Serial Data Sequences," which is incorporated herein by reference for all purposes.

FIELD OF THE INVENTION

The invention relates generally to jitter measurement and, more particularly, methods and apparatus for decomposing timing jitter on signals under test (SUTs) comprising arbitrary serial data sequences.

BACKGROUND OF THE INVENTION

As tighter timing margins and rapidly ascending clock rates drive today's high-speed designs, timing jitter (hereafter referred to simply as "jitter") is becoming a more significant cause of system errors. Jitter can significantly reduce margin in an otherwise sound design. For example, excessive jitter can increase the bit error rate (BER) of a communications signal by incorrectly transmitting a data bit stream. In digital systems, jitter can violate timing margins, causing circuits to behave improperly. As a consequence, measuring jitter accurately is necessary to determine the robustness of a system and how close it is to failing.

In the field of serial data communications, the term "jitter" refers to the deviation of the significant edges in a sequence of data bits from their ideal locations in time. On serial data links, the data clock is typically not transmitted with the data, so the jitter can cause data errors at the receiving end.

Jitter can be divided into two generalized categories: deterministic jitter (DJ) and random jitter (RJ). These two categories of jitter accumulate differently in the serial data communications link, and it is desirable to be able to separate and measure each of the two categories of jitter. The deterministic jitter can further be divided into three components: inter-symbol interference (ISI), duty cycle distortion (DCD) and periodic jitter (PJ). It is again desirable to measure each individual component of the deterministic jitter as an aid in diagnosing the cause(s) of the jitter.

A number of methods have been developed for measuring jitter on data streams, and for decomposing this jitter into its various components. Signal acquisition devices such as digital storage oscilloscopes (DSOs) can be used to facilitate real time jitter analysis of an SUT.

A weakness of several of the known methods is that they require a repeating pattern of known length in order to separate out one of the jitter components, namely, the ISI. In one of the known methods, the data sequence must consist solely of a repeating pattern of known length, even though the specific bit values need not be known. In another prior art method, a pattern for which the data bits are completely known must be repeated (possibly interspersed with other data).

Moreover, existing methods that provide analysis on an arbitrary data stream are not capable of fully decomposing the jitter, and require expensive, special-purpose equipment. Existing methods for fully decomposing jitter require that the data stream carry a repeating pattern with a known length, or a completely known sub-pattern that is frequently repeated.

SUMMARY OF INVENTION

These and other deficiencies of the prior art are addressed by the present invention of a method and apparatus for decomposing timing jitter on arbitrary serial data sequences. Specifically, in one embodiment according to the present invention, a method is provided of decomposing timing jitter on a signal under test (SUT) comprising an arbitrary serial data stream. The method comprises performing a statistical analysis on a group of measurements, where each measurement comprises a timing jitter value and an associated bit pattern representing the bits falling within an analysis window, said window being successively located at a plurality of positions within the data stream.

BRIEF DESCRIPTION OF THE DRAWINGS

The teachings of the present invention can be readily understood by considering the following detailed description in conjunction with the accompanying drawings, in which:

FIG. 5 depicts another series of bits according to an embodiment of the present invention.

DETAILED DESCRIPTION OF THE INVENTION

The subject invention will be primarily described within the context of a measurement apparatus such as a DSO. However, it will be appreciated by those skilled in the art that the invention may be advantageously employed in any signal measurement or analysis device in which one or a plurality of SUTs may be processed to derive the timing parameters of a plurality of contiguous events.

Figure 1:
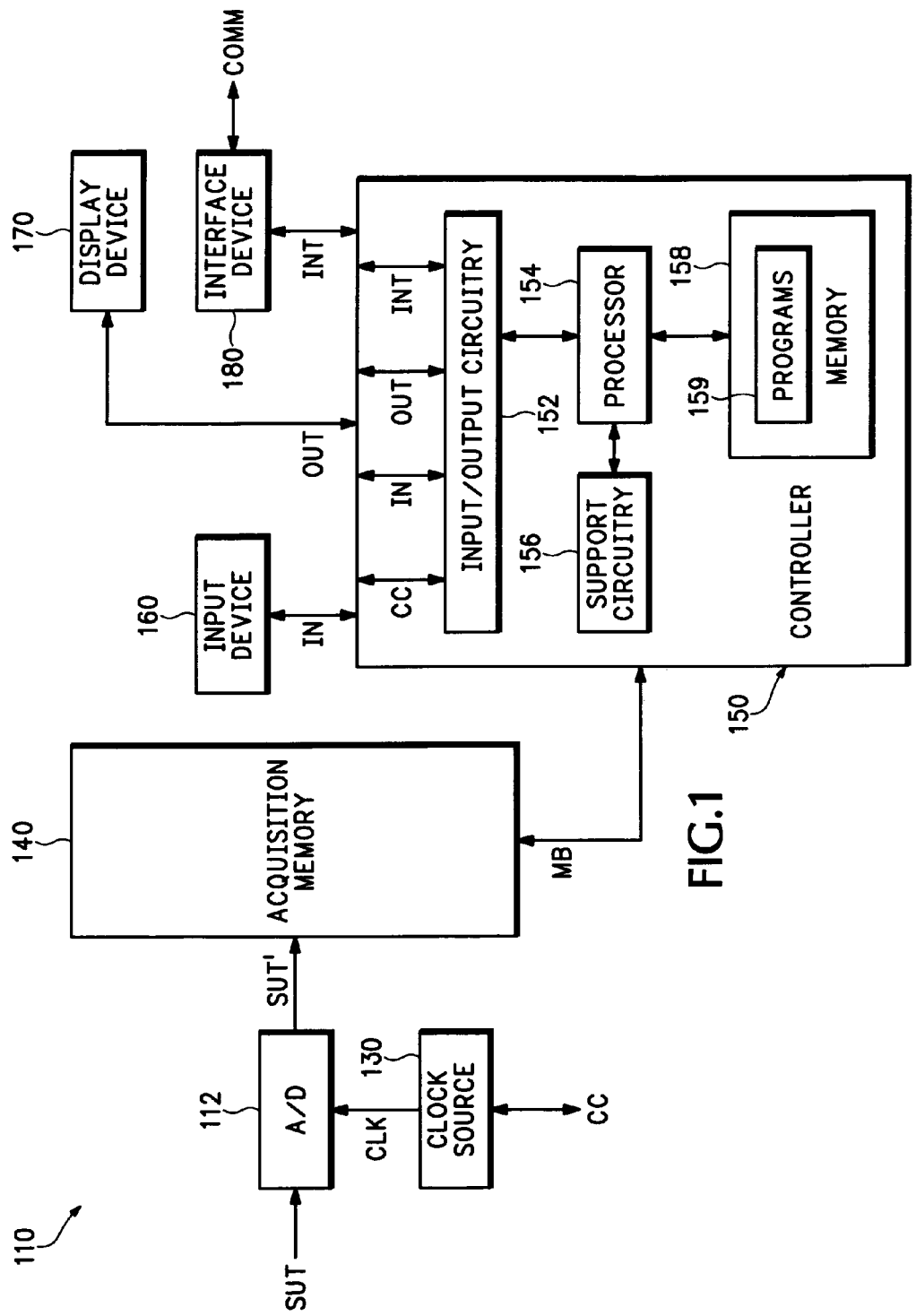
FIG. 1 depicts a high level block diagram of a signal analysis system.

FIG. 1 depicts a high level block diagram of a signal analysis device. Specifically, the system (signal analysis device) 110 of FIG. 1 comprises an analog to digital (A/D) converter 112, a clock source 130, an acquisition memory 140, a controller 150, an input device 160, a display device 170 and an interface device 180.

The A/D converter 112 receives and digitizes an SUT in response to a clock signal CLK produced by the clock source 130. The clock signal CLK is preferably a clock signal adapted to cause the A/D converter 112 to operate at a maximum sampling rate, though other sampling rates may be selected. The clock source 130 is optionally responsive to a clock control signal CC produced by the controller 150 to change frequency and/or pulse width parameters associated with the clock signal CLK.

A digitized output signal SUT' produced by the A/D converter 112 is stored in the acquisition memory 140. The acquisition memory 140 cooperates with the controller 150 to store the data samples provided by the A/D converter 112 in a controlled manner such that the samples from the A/D converter may be provided to the controller 150 for further processing and/or analysis.

The controller 150 is used to manage the various operations of the system 110. The controller 150 performs various processing and analysis operations on the data samples stored within the acquisition memory 140. The controller 150 receives user commands via an input device 160, illustratively a keypad or pointing device. The controller 150 provides image-related data to a display device 170, illustratively a cathode ray tube (CRT), liquid crystal display (LCD) or other display device. The controller 150 optionally communicates with a communications link COMM, such as a general purpose interface bus (GPIB), Internet protocol (IP), Ethernet or other communications link via the interface device 180. It is noted that the interface device 180 is selected according to the particular communications network used. An embodiment of the controller 150 will be described in more detail below.

The system 110 of FIG. 1 is depicted as receiving only one SUT. However, it will be appreciated by those skilled in the art that many SUTs may be received and processed by the system 110. Each SUT is preferably processed using a respective A/D converter 112, which respective A/D converter may be clocked using the clock signal CLK provided by a common or respective clock source 130 or some other clock source. Each of the additional digitized SUTs is coupled to the acquisition memory 140 or additional acquisition memory (not shown). Any additional acquisition memory communicates with the controller 150, either directly or indirectly through an additional processing element.

The controller 150 comprises a processor 154 as well as memory 158 for storing various control programs 159. The processor 154 cooperates with conventional support circuitry 156 such as power supplies, clock circuits, cache memory and the like, as well as circuits that assist in executing the software routines stored in the memory 158. As such, it is contemplated that some of the process steps discussed herein as software processes may be implemented within hardware, for example as circuitry that cooperates with the processor 154 to perform various steps. The controller 150 also contains input/output (I/O) circuitry 152 that forms an interface between the various functional elements communicating with the controller 150. For example, in the embodiment of FIG. 1, the controller 150 optionally communicates with the clock source 130 (via clock control signal CC). The controller 150 also communicates with the input device 160 via a signal path IN, a display device 170 via a signal path OUT and the interface device 180 via a signal path INT and the acquisition memory 140 via signal path MB. The controller 150 may also communicate with additional functional elements (not shown), such as those described herein as relating to additional channels, SUT processing circuitry, switches, decimators and the like. It is noted that the memory 158 of the controller 150 may be included within the acquisition memory 140, that the acquisition memory 140 may be included within the memory 158 of the controller 150, or that a shared memory arrangement may be provided.

Although the controller 150 is depicted as a general purpose computer that is programmed to perform various control functions in accordance with the present invention, the invention can be implemented in hardware as, for example, an application specific integrated circuit (ASIC). As such, the process steps described herein are intended to be broadly interpreted as being equivalently performed by software, hardware or a combination thereof.

Considering now a typical jitter measurement sequence, a waveform is acquired and stored in the memory of a DSO. The invention provides apparatus and methods for separating the jitter components on an arbitrary serial data stream. As mentioned herein, existing methods that provide analysis on an arbitrary data stream are not capable of fully decomposing the jitter, and are expensive. Existing methods for fully decomposing jitter require that the data stream carry a repeating pattern with a known length, or a completely known sub-pattern that is frequently repeated. In contrast, a proposed method performs a full decomposition on completely arbitrary data streams, with no requirement for repetition or for prior knowledge of the data sequence.

In one embodiment, a methodology determined by the inventor relies on an assumption that each data transition's significant causative effects on other transitions are contained within a relatively small "time window" surrounding that transition. For example, a specific transition may only have a measurable effect on transitions that occur in the four or five symbols that immediately follow it.

For example, consider two adjacent bits at an arbitrary location in the data stream. The four possible data patterns that may be represented by the two bits are: {0 to 0, 0 to 1, 1 to 0, 1 to 1}. Of these, the first and last patterns do not have a transition, and thus are not subject to jitter. In one embodiment, only when a pair of bits of alternate value occurs do we need to look for jitter. Furthermore, since systems frequently exhibit one impulse response for rising edges and a different impulse response for falling edges, the 0 to 1 transition should be analyzed separately from the 1 to 0 transition. For illustrative purposes, the rising (0 to 1) transition will be described herein.

For illustrative purposes, assume that data-dependent jitter (ISI or DDJ) is caused solely by the effect mentioned above, and that the step response only differs from its steady-state value over a time period corresponding to some small number of bits, N. Then, the number of different patterns that need to be considered (even if the composite data stream has random and/or non-repeating content) is limited to (on the order of) $2^N$.

For example, assume that a rising edge may be affected by the four bits that preceded the 0 to 1 pattern, and by the single subsequent bit. Since only five bits (in addition to the two bits that define the transition) are to be considered in this example, there are $2^5$ cases. (There are another $2^5$ cases for the falling edge, but those can be considered separately).

Figure 2:
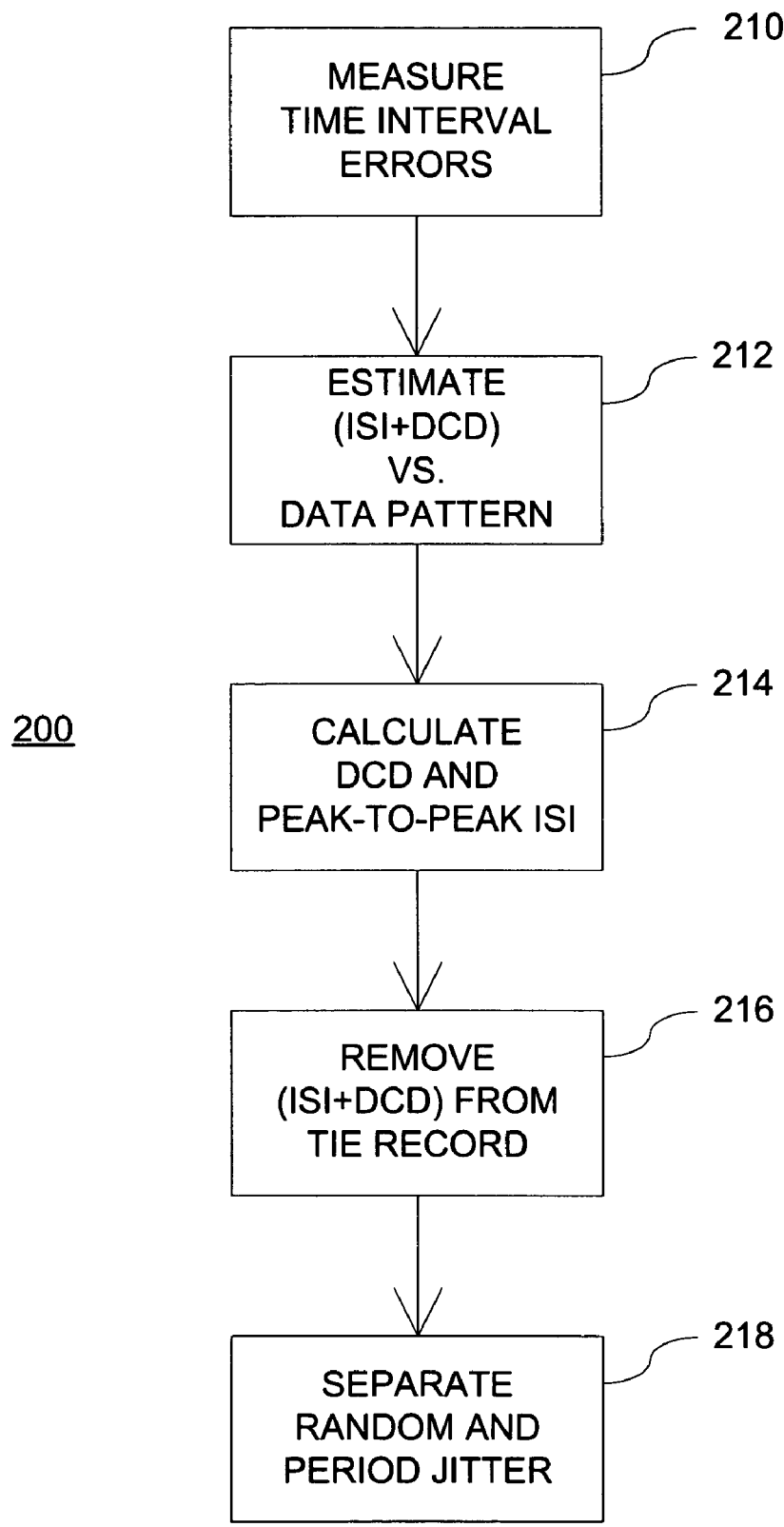
FIG. 2 depicts a flow diagram of an analysis program for separating the jitter components on a serial data stream suitable for use in the system of FIG. 1.

FIG. 2 depicts a flow diagram of a method 200 suitable for use in the system 110 of FIG. 1. Specifically, FIG. 2 depicts a method of separating the jitter components on a serial data stream, even if the data pattern is not known or repeating. In one embodiment according to the present invention, this method comprises measuring the Time Interval Errors (TIE) on the data stream 210, estimating (finding) the (ISI+DCD) versus data pattern 212, calculating the DCD and the peak-to-peak ISI 214, removing (subtracting out) the (ISI+DCD) from the TIE record 216 and using a spectral approach to separate the remaining TIE into periodic and random components 218. It is envisioned by the inventor that in some embodiments approaches other than a spectral approach can be implemented (e.g., a histogram-based approach).

The exemplary methodology of FIG. 2 will now be examined in more detail. At step 210, when measuring the Time Interval Errors (TIE) on the data stream, the system 110 captures and analyzes a sample of the SUT. The SUT has continuous amplitude-versus-time record of some finite duration. The system 110 captures and analyzes the SUT so that the result of the analysis is an ordered list of time tags, where each time tag represents the exact time when the data-bearing signal crossed a chosen threshold.

The system 110 also generates an array representing the actual binary data bits comprising the signal. This process is accomplished, for example, using a DSO for the data capture, and a digital computer equipped with the appropriate filtering and interpolating software for the analysis.

The system 110 compares the acquired list of time tags to a list of time tags representing a jitter-free version of the same data stream that was acquired. The jitter-free version of the data stream is generated by one of several methods, generally falling under the topic of Clock Recovery, known to those of ordinary skill in the art. The result of this comparison is an ordered list of time-interval error tags, which is referred to herein as a "TIE record." At each point where no transition occurs (because two adjacent bits are identical), a value of zero, or any other convenient value, may be inserted as a place-holder. These values will be replaced when separating the remaining TIE into periodic and random components 218.

Figure 3:
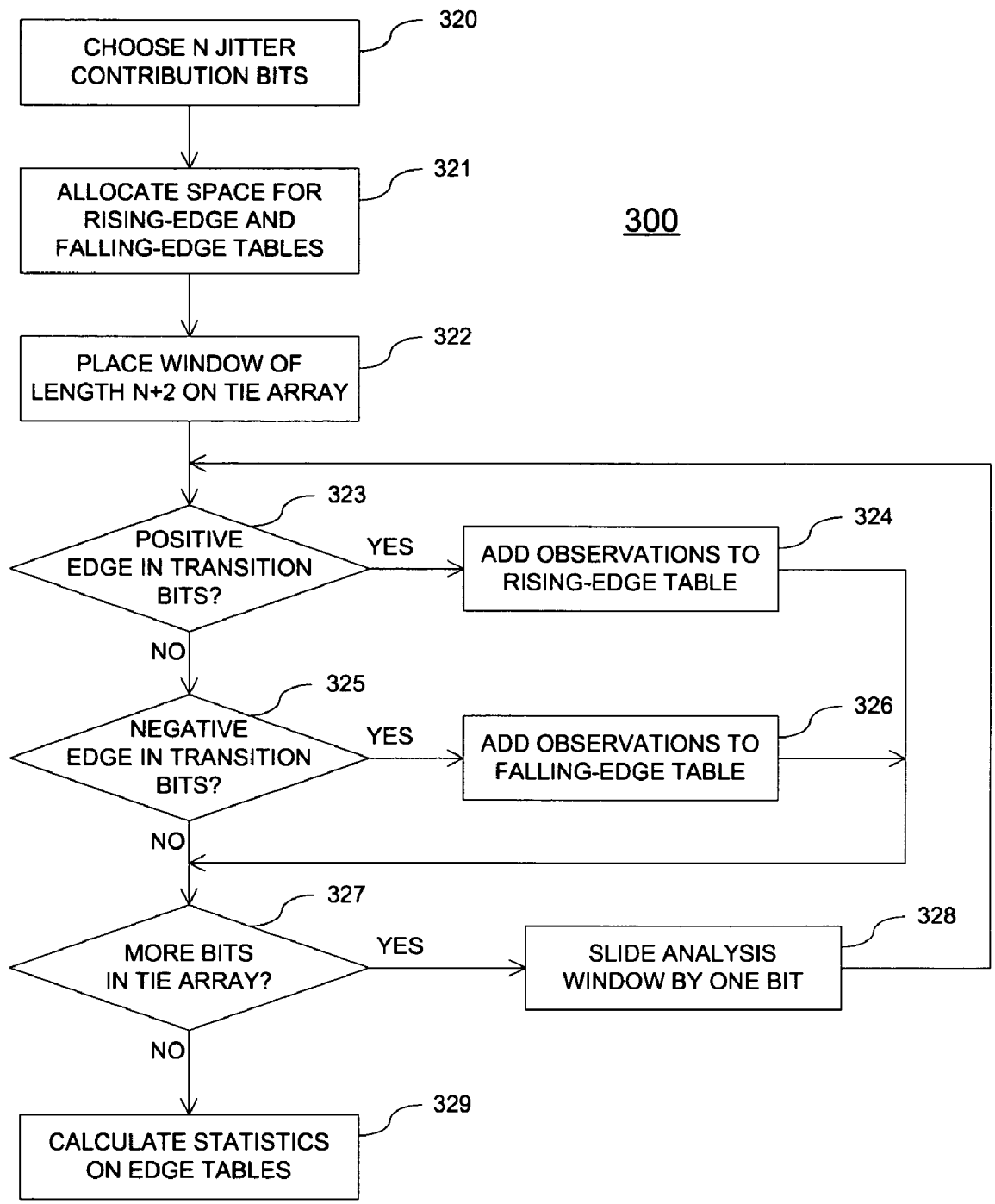
FIG. 3 depicts a flow diagram of the steps performed by the analysis program in estimating the ISI+DCD versus data pattern.

At step 212, in reference to estimating the (ISI+DCD) versus data pattern, a table of $2^N$ arrays is allocated in a suitable memory space. Here, N is the number of bits (in addition to the two bits comprising the data transition) that are considered to significantly contribute to the data-dependent jitter. FIG. 3 will show an exemplary flow diagram of a method 300 suitable for compiling tables of ISI and DCD values.

Referring to FIG. 3, in this illustrative example, N is chosen to be equal to 5 at step 320 since it is desired to consider four bits preceding the transition and one bit following the transition. Thus, for each unique pattern of N bits that surround a transition, there exists in this "rising-edge" table an array that may be used to store information relevant to that unique pattern. (A similar table is prepared to support falling-edge analysis.) At step 321, the table of arrays is allocated as mentioned herein.

At step 322, an analysis window with a width of N+2 bits is positioned on the first N+2 bits in the serial data array. During an iterative sequence of analysis cycles (steps 323-328), the analysis window is slid along the list of binary data bits, from beginning to end. After each analysis cycle, the window is advanced by one bit (step 328). This process is suggested graphically in FIG. 4, using N+2=7.

Figure 5:
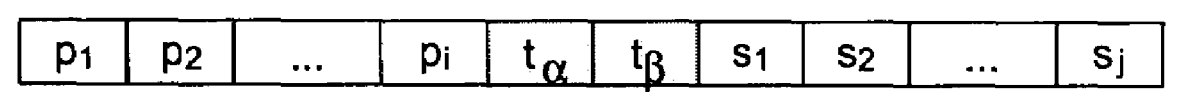

During each analysis cycle, the system 110 performs a number of operations on the bits in the current analysis window. For illustrative purposes, the bits can be identified as shown in FIG. 5. The bits $t_\alpha$ and $t_\beta$ represent the bit positions that the system 110 is analyzing (and that may or may not contain a transition). The bits $p_1$-$p_i$ are the i bits preceding the transition, which are considered to contribute to the DDJ. The bits $s_1$-$s_j$ are the j bits subsequent to the transition that are considered to contribute to the DDJ. In this illustrative example, i=4 and j=1 so that N=i+j=5.

In one embodiment, the operations for each cycle are as follows. If the transition bits ($t_\alpha$, $t_\beta$) are (0, 0) or (1, 1), then there is no transition corresponding to this analysis cycle. In other words, there was no positive edge transition at step 323 and no negative edge transition at step 325. In the absence of transitions then the pattern-matching operation (described infra) is skipped for this processing cycle.

At step 327, if there are more bits in the TIE array then the analysis window is simply advanced by one bit at step 328.

At step 323, the transition bits ($t_\alpha$, $t_\beta$) are checked for a (0, 1) pattern, corresponding to a rising transition. If a rising transition is found then a rising-edge analysis (step 324) is performed according to the pattern-matching operation and the observations are added to the rising-edge table.

At step 325, the transition bits ($t_\alpha$, $t_\beta$) are checked for a (1,0) pattern, corresponding to a falling transition. If a falling transition is found then a falling-edge analysis (step 326) is performed in a manner analogous to the pattern-matching operation but using a separate "falling-edge" table, and the observations are added to the falling-edge table.

Regarding the pattern-matching operation, the $\{p_i\}$ bits and $\{s_j\}$ bits are concatenated into a single N-bit digital word, which is used as an index into the "rising-edge" table. The system 110 adds the time-interval-error quantity that corresponds to the bit pair ($t_\alpha$, $t_\beta$) to the array at this table index. The system 110 later performs a statistical analysis on the elements of this array at step 329.

It will be appreciated by those skilled in the art that the concatenation method used in the pattern-matching operation is one illustrative method of uniquely mapping the possible bit patterns to entries in the "rising-edge" table. Any other method that establishes a one-to-one mapping between bit patterns and table entries may be used to implement the pattern-matching operation.

Figure 4:
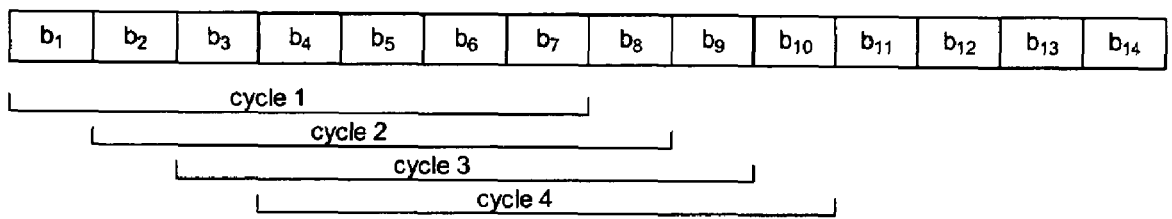
FIG. 4 depicts a series of bits according to an embodiment of the present invention.

After the system 110 slides the analysis window over the full length of the available data, each (in one embodiment) element of the table related to the discussion of FIG. 4 comprises an array including the observations of the jitter error corresponding to a particular bit pattern surrounding a rising edge. At this point, for each of the $2^N$ elements in the rising edge table, the system 110 calculates the mean value of the array of jitter observations for that element. Since the table only (in one embodiment) includes observations related to rising edges, there will be no duty-cycle-related jitter in the observations in one embodiment. If there is no random or periodic jitter on the signal, and if a sufficient number of preceding bits (i) and succeeding bits (j) have been included in the analysis, all (in one embodiment) of the observations in a given table position should be identical and should represent the amount of ISI caused by the corresponding bit pattern. In this case, the mean value of the observations will be equal to each of the identical observations. If the random jitter and/or periodic jitter is non-zero and is not correlated with the data sequence, then the mean value of the observations in each table element is a valid estimate of the jitter caused by the corresponding bit pattern. The quality of this estimate grows as the number of observations being averaged grows.

The most positive mean value in the rising-edge table (referred to herein as $ISI+_{max}$) indicates the peak forward deviation (that is, advanced in time) among the rising edges. The most negative mean value (referred to herein as $ISI+_{min}$) indicates the peak reverse deviation (that is, retarded in time) among the rising edges. The difference between these two numbers is the peak-to-peak deviation due to ISI on rising edges. Similarly, a falling-edge analysis will reveal $ISI-_{max}$ and $ISI-_{min}$, the peak ISI deviations on falling edges. Finally, the difference between MAX$\{ISI+_{max}, ISI-_{max}\}$ and MIN$\{ISI+_{min}, ISI-_{min}\}$ gives the peak-to-peak value of ISI+DCD. A separate computation of $DCD_{pk-pk}$, described herein, allows the system 110 to determine the value of $ISI_{pk-pk}$ by subtraction.

Referring again to step 214 of calculating the DCD and peak-to-peak ISI of FIG. 2, the system 110 can estimate the duty-cycle distortion (DCD) in a separate operation as follows.

The system 110 forms a weighted average of the mean rising-edge ISI values from the rising-edge table the system 110 constructed. That is, the system 110 multiplies the mean ISI value corresponding to each (in one embodiment) data pattern by the number of times the system 110 observed that pattern. The system 110 adds these products together for the patterns, and divides the sum by the number of pattern-matching operations. The result of this calculation is the mean ISI for all rising edges, $ISI+_{mean}$. The system 110 repeats this calculation on the falling-edge table to compute the mean falling-edge ISI, $ISI-_{mean}$. The difference between these two means is the jitter related to duty cycle, or DCD.

It is noteworthy that the system 110 can also determine the values $ISI+_{mean}$ and $ISI-_{mean}$ by going back to the original TIE record and computing the mean TIE on the rising edges and the mean TIE on the falling edges, respectively.

This DCD is a peak-to-peak value (since the probability density function for DCD comprises of a pair of impulses). The (ISI+DCD) the system 110 calculated herein was also a peak-to-peak value. Therefore, the system 110 calculates the peak-to-peak ISI by:

$$ISI_{pk-pk} = (ISI+DCD) - DCD \qquad \text{Eq. 1}$$

Referring again to step 216 of subtracting out the (ISI+DCD) from the TIE record, one result of finding (ISI+DCD) versus the data pattern was a table that provided the (ISI+DCD) value for the localized data patterns that occur in the data sequence. The system 110 subtracts these values from the TIE record so that only the periodic and random components of the TIE remain.

Figure 6:
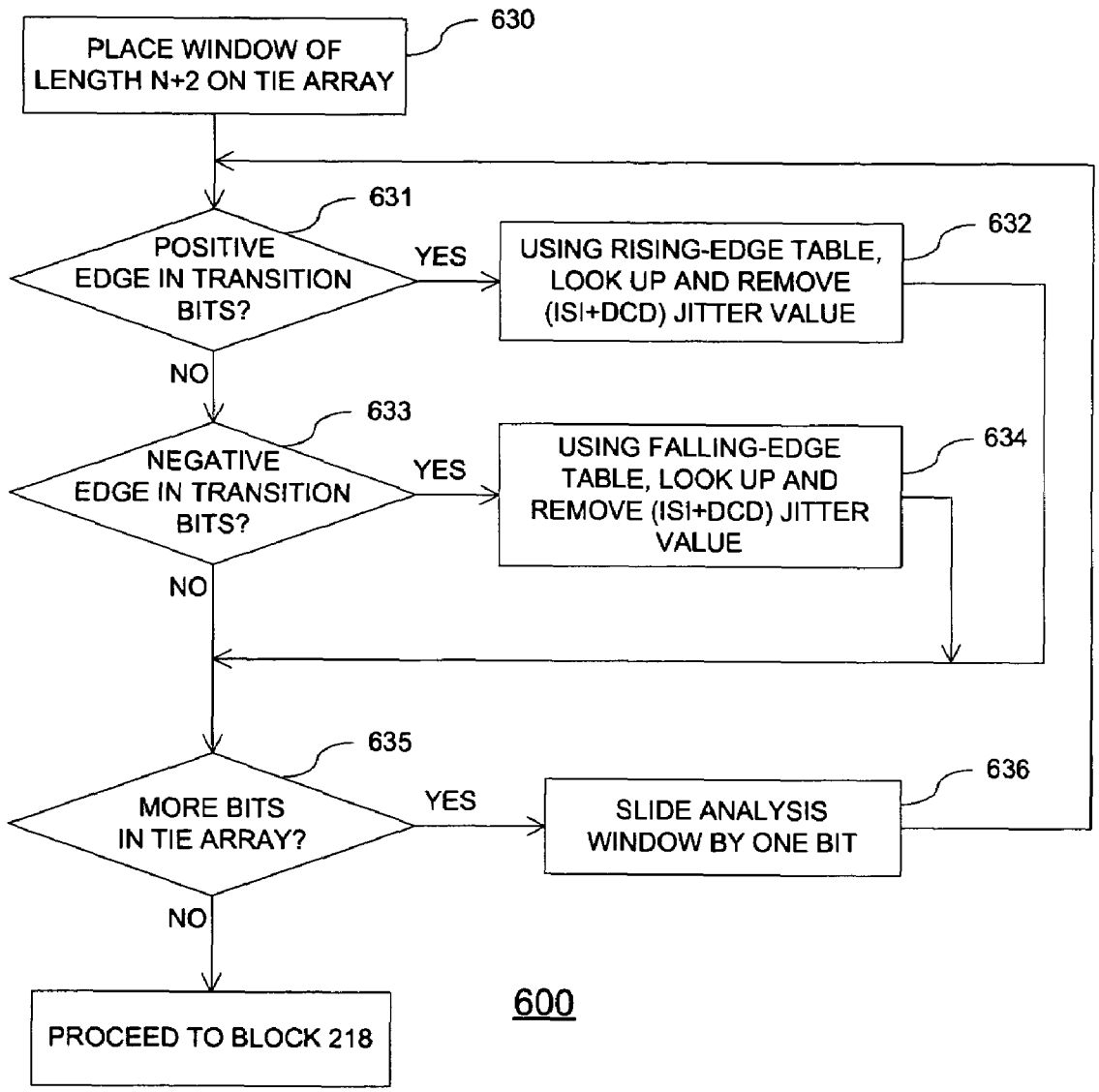
FIG. 6 depicts a flow diagram of the steps performed by the analysis program in removing the ISI+DCD jitter from the serial data stream.

In a manner similar to the operations discussed with respect to FIG. 4, the system 110 slides an analysis window with a width of N+2 bits along the list of binary data bits, from beginning to end. A jitter-removal operation is performed for each window position, after which the system 110 advances the window by one bit. FIG. 6 will show a flow diagram of a method 600 suitable for removing ISI and DCD from an SUT.

More specifically, referring to FIGS. 5 and 6, during the ISI+DCD removal process the system 110 performs the following operations. In one embodiment, at step 630 the system 110 places an analysis window of length N+2 on the first N+2 bits of the TIE array. At step 631, the transition bits $(t_\alpha, t_\beta)$ are checked for a (0, 1) pattern, corresponding to a rising transition. If a rising transition is found then the system 110 selects the rising-edge table at step 632 and applies the jitter-correction operation (described infra). At step 633, the transition bits $(t_\alpha, t_\beta)$ are checked for a (1,0) pattern, corresponding to a falling transition. If a falling transition is found, then the system 110 selects the falling-edge table at step 634 and applies the jitter-correction operation. If, on a given processing cycle, the transition bits $(t_\alpha, t_\beta)$ comprise (0, 0) or (1, 1), then there is no transition on this cycle and neither step 632 nor 634 is performed.

At step 635, if there are no more bits in the TIE array then the ISI+DCD removal process 216 is complete. If there are more bits in the TIE array then the system 110 advances the analysis window by one bit at step 636 and begins the next processing cycle at step 631.

The aforementioned jitter-correction operation is described as follows. The system 110 concatenates the $\{p_i\}$ bits and $\{s_j\}$ bits into an N-bit digital word. The system 110 uses the word as an index into the table selected in the prior operation. The system 110 subtracts the ISI value indexed by these bits (i.e., the jitter that is attributed to this pattern) from the value in the TIE array that corresponds to the $(t_\alpha, t_\beta)$ transition.

Referring again to separating the remaining TIE into periodic and random components 218, the system 110 has compensated the TIE record that now remains so that the TIE record no longer includes the effect of ISI or DCD. The system 110 may separate the TIE record into periodic and random components using substantially the same technique described herein, based on spectral analysis. In one embodiment, the system 110 treats all spectral impulses as periodic jitter.

At each point in the compensated TIE record where no corresponding transition occurred because two adjacent bits are identical, e.g. (0,0) or (1, 1), the system 110 inserts an estimated TIE value by linear interpolation from the nearest two bounding TIE values derived from actual transitions. The system 110 converts the interpolated TIE record to the complex frequency domain by applying a processing window (e.g., Blackman, etc.) and then performing a Fast-Fourier Transform (FFT).

The system forms an estimate of the power spectral density by representing the FFT results as magnitude versus frequency. The system 110 determines the locations (or bins) in the power spectrum corresponding to deterministic noise (i.e., periodic jitter) by applying techniques known to those of skill in the art.

Beginning with the complex FFT results from above, the system 110 sets the bins attributable to random noise to zero so that only the bins representing deterministic noise remain. The system 110 converts this array back to the time domain via an inverse FFT, after which the effects of the processing window are reversed over the central third of the record. Disregarding those positions corresponding to TIE values that were interpolated, the peak-to-peak value of this periodic jitter is found.

Beginning with the complex FFT results, the system 110 calculates the RMS value of the bins attributable to noise. Since this calculation is based on a subset of the total number of bins, it is normalized by the number of bins used in the calculation. The resulting RMS value is taken as the standard deviation of the random jitter, which is assumed to have a Gaussian probability density function.

In various embodiments, estimating the (ISI+DCD) versus data pattern 212 (among other operations) is modified. In the embodiment described supra, a table of $2^N$ entries is allocated, where each entry can hold an array of TIE observations. After the table has been filled, the system 110 computes the mean value of the observations in the arrays (after which the individual observations are not needed). However, in this embodiment the required size for each array is unknown when the table is set up. It is contemplated to set up a table for which each entry comprises only (in one embodiment) two items: a running sum of the observations corresponding to this table index ($\Box X_K$), and a count of the number of observations that have been so added (K). The system 110 can calculate the mean for each table entry using the formula:

$$\overline{X} = \frac{1}{K} \cdot \sum_{k=1}^{K} X_k \qquad \text{Eq. 2}$$

where K and $$\sum_{k=1}^{K} X_k$$

are the two items in the table.

In another embodiment, an extension of the TIE tables to measure variance is contemplated. Allocating three items for each table entry, instead of two, could extend the usefulness of a TIE table. The third item can be used to hold a running sum of the squares of the observations for each table index. The variance for each table index is computed in estimating the (ISI+DCD) versus data pattern 212, using the following equation:

$$Var(X) = E\{(X-\overline{X})^2\} = E\{X^2\} - (\overline{X})^2 \quad \text{Eq. 3}$$

where $$E\{X^2\} = \frac{1}{K} \cdot \sum_{k=1}^{K} X_k^2 \text{ and } \sum_{k=1}^{K} X_k^2$$

is the third item in the table.

In another embodiment, the completed rising-edge table and falling-edge table can be used to estimate the probability distribution function (PDF) of the ISI+DCD. It is useful to know the PDF of the ISI+DCD for the purpose of estimating the PDF of the overall jitter. Those skilled in the art will recognize that this knowledge allows the eye-opening at a given BER to be predicted (e.g., using a bathtub curve). The estimated PDF for the ISI+DCD is formed as follows. In one embodiment, each element in the tables comprises at least two pieces of information. The first piece of information is the number of times that the corresponding pattern was observed. This is the value K in equations 2 and 3. The second piece of information is the mean ISI that corresponds to that pattern, which is the value $\overline{X}$ in equations 2 and 3.

A histogram is now created using all the entries in both of the tables. The horizontal axis of the histogram represents the mean time interval error, in seconds or other convenient units. The vertical axis of the histogram represents the number of times the corresponding TIE value was observed. For each element in the tables, the mean ISI value ($\overline{X}$) is used as the horizontal coordinate into the histogram, and the number of observations (K) is accumulated with all the other populations from other table entries with the same mean ISI. Once all the table entries have been accumulated into the histogram, the vertical axis may be divided (normalized) by the total number of jitter observations represented by the histogram (since this will allow the histogram to be interpreted more naturally as a PDF). It will be recognized by those skilled in the art that the actual construction of a histogram is useful conceptually but not necessary practically, and that the same information regarding the ISI+DCD PDF may be extracted using more direct techniques.

Thus, a method of separating the jitter components on an arbitrary serial data stream has been shown and described. The data pattern being analyzed can be completely arbitrary. As mentioned herein, the data pattern need not be a repeating pattern, and if repeating, the pattern length need not be known. Known methods only measure the amplitude of the total ISI jitter (i.e., the ISI jitter due to both rising and falling edges combined). The analysis that is performed according to the described methods can reveal a number of more specific details. For each of the two edges (rising and falling), the following quantities can be measured and reported: the total amplitude of the ISI jitter on a specified edge only, the two specific data patterns that account for the extrema of the ISI jitter for a specified edge, and the specific bits or bit pairs (transitions) within the analysis window that account for the greatest variability in the data dependency.

In the prior art, data-dependent (ISI) jitter cannot be distinguished from periodic jitter that happens to be exactly harmonically related to the fundamental frequency of a repeating pattern. Separation methods of the prior art that rely on a spectral approach can make a distinction only if a spectral peak due to periodic jitter is sufficiently removed from any ISI-related peaks. The described approach is capable of distinguishing periodic jitter components that fall much closer to such ISI-related spectral artifacts.

The invention has been primarily described within the context of a method of separating the jitter components on an arbitrary serial data stream utilizing a DSO. It will be appreciated by those skilled in the art and informed by the teachings of the present invention that devices other than a DSO can be used in conjunction with the present invention.

While the foregoing is directed to the preferred embodiment of the present invention, other and further embodiments of the invention may be devised without departing from the basic scope thereof, and the scope thereof is determined by the claims that follow.

What is claimed is:

1. A method of decomposing timing jitter on a signal under test (SUT) comprising an arbitrary serial data stream, said method comprising:
    forming a group of measurements, where each measurement includes a timing jitter value and an associated bit pattern representing bits falling within an analysis window of a chosen length, said analysis window being successively located at a plurality of positions within the SUT; and
    performing a statistical analysis on said group of measurements to calculate a mean value of inter-symbol interference (ISI) associated with each bit pattern.

2. The method of claim 1, wherein said ISI is determined for a specified edge polarity only.

3. The method of claim 1, further comprising separating random and periodic jitter from said timing jitter.

4. The method of claim 1, further comprising estimating duty cycle distortion (DCD) from said timing jitter.

5. The method of claim 4, further comprising removing said DCD from said timing utter.

6. The method of claim 4, further comprising estimating the probability density function (PDF) of said ISI plus said DCD.

7. The method of claim 1, further comprising removing said ISI from siad timing jitter.

8. The method of claim 1, further comprising estimating a probability density function (PDF) of said ISI.

9. A test and measurement device, comprising:
    an acquisition module, for acquiring signal under test SUT to produce a sample stream;
    a processing module, for
        forming a group of measurements, where each measurement includes a timing jitter value and an associated bit pattern representing bits falling within an analysis window of a chosen length, said analysis window being successively located at a plurality of positions within the sampl stream, and
        performing a statistical analysis on said group of measurements to calculate a mean value of inter-symbol interference (ISI) associated with each bit pattern; and
    a display module, for displaying results of said statistical analysis.

10. The test and measurement device of claim 9, wherein said processing module is further for determining said ISI for a specified edge polarity only.

11. The test and measurement device of claim 9, wherein said processing module is further for separating random and periodic jitter from said timing utter.

12. The test and measurement device of claim 9, wherein said processing module is further for estimating duty cycle distortion (DCD) from said timing jitter.

13. The test and measurement device of claim 12, wherein said processing module is further for removing said DCD from said timing jitter.

14. The test and measurement device of claim 9, wherein said processing module is further for removing said ISI from said timing jitter.

15. A computer-readable media for storing software instructions which when executed by a processor perform the steps of:

decomposing timing jitter on a signal under test (SUT), the SUT being an arbitrary serial data stream, by forming a group of measurements, where each measurement includes a timing jitter value and an associated bit pattern representing bits falling within an analysis window of a chosen length, said analysis window being successively located at a plurality of positions within the arbitrary serial data stream; and performing a statistical analysis on said group of measurements to calculate the a mean value of inter-symbol interference (ISI) associated with each bit pattern.

16. The computer-readable media of claim 15, wherein said ISI is determined for a specified edge polarity only.

17. The computer-readable media of claim 15, further comprising instructions for separating random and periodic jitter from said timing jitter.

18. The computer-readable media of claim 15, further comprising instructions for estimating duty cycle distortion (DCD) from said timing jitter.

19. The computer-readable media of claim 18, further comprising instructions for removing said DCD from said timing jitter.

20. The computer-readable media of claim 15, further comprising instructions for removing said ISI from said timing jitter.

* * * * *